April 20, 1971     E. N. VEST     3,575,774
DECORATIVE FOLDED HONEYCOMB STRUCTURE AND
METHOD OF MAKING SAME Filed Sept. 18, 1968     2 Sheets-Sheet 1

INVENTOR.
ERIK N. VEST
BY Curtis Ailes
ATTORNEY.

April 20, 1971   E. N. VEST   3,575,774
DECORATIVE FOLDED HONEYCOMB STRUCTURE AND
METHOD OF MAKING SAME
Filed Sept. 18, 1968   2 Sheets-Sheet 2
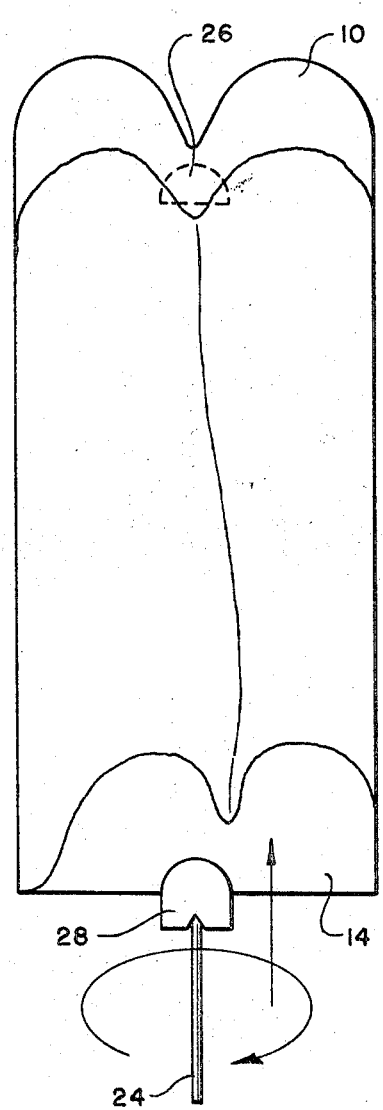
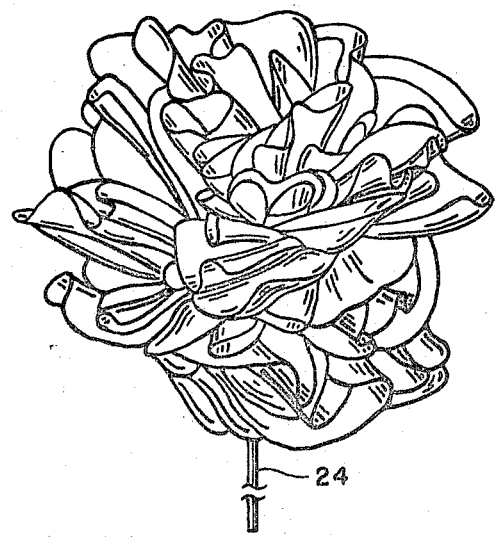
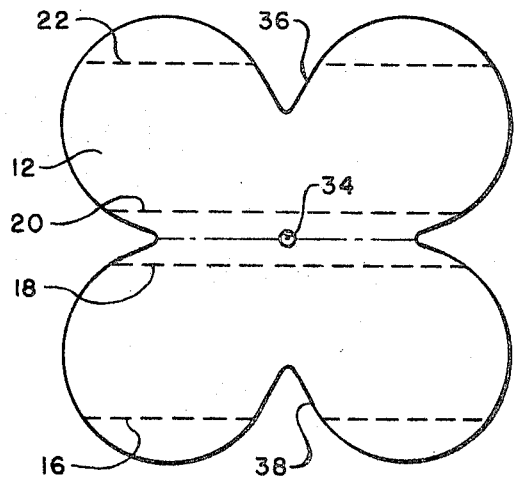

United States Patent Office 3,575,774
Patented Apr. 20, 1971

3,575,774
DECORATIVE FOLDED HONEYCOMB STRUCTURE
AND METHOD OF MAKING SAME
Erik N. Vest, Strammelse, Landet, Tasinge, Denmark,
assignor to Svendborg Kotillonfabrik Ltd., Svendborg,
Denmark, and The Amscan Company, Inc., Harrison,
N.Y., fractional part interest to each
Filed Sept. 18, 1968, Ser. No. 760,500
Int. Cl. A41g 1/00
U.S. Cl. 161—27                                      14 Claims

ABSTRACT OF THE DISCLOSURE

A plurality of layers of sheet material are combined in a honeycomb structure which can be expanded from a folded condition and then twisted and compressed at the central portions thereof to provide a decorative object having an appearance simulating a structure of a plant such as a flower blossom.

---

This invention relates to the production of decorative objects, and more particularly to the production of decorative objects which may have an appearance simulating living plants, and particularly the flowers or blossoms of living plants.

There is a considerable demand for decorative objects which have a flower-like appearance. These objects have been rather difficult and expensive to provide in the past because the forming of the individual layers of sheet material to simulate flower petals, and the artful arrangement of those petals with relation to one another has been found to be a time-consuming operation. Furthermore, a certain degree of artistic ability is required, thus reducing the class of people who are capable of producing this item.

Furthermore, when such decorative objects are completely preformed in the factory before shipment, they are extremely fragile in shipment and are liable to become crushed and damaged so that they do not have the correct appearance when they are unpacked. In attempting to prevent crushing and damage, extremely bulky and expensive shipping cartons are required.

If such objects are shipped in a folded condition, the ultimate user must spend a great deal of time unfolding and forming the object, and he must have the requisite artistic ability to achieve a satisfactory result.

Accordingly, it is a purpose of this invention to provide an improved method for forming a truly decorative object resembling a natural object, such as a flower, in which very little skill is required to accomplish the desired result.

It is another purpose of the present invention to provide a structure which is capable of being shipped in a compact form and which is easily and quickly opened to form a finished decorative object.

Further purposes and advantages of the invention will be apparent from the following description and the accompanying drawings.

The invention may be carried out by combining a plurality of layers of sheet material in a honeycomb structure by adhering the layers at alternating spaced parallel portions thereof and cutting the edges of the plurality of combined layers to a desired decorative outline. The resultant honeycomb is then expanded by translationally moving the top and bottom layers apart with the expanded honeycomb extended therebetween. The honeycomb is twisted and compressed by relative rotation of the upper and lower layers about an axis parallel to the direction of expansion while reducing the spacing between the central portions of the upper and lower layers. The plurality of layers are then fixed together at the central portions thereof in the twisted and compressed condition.

In the accompanying drawings:

FIG. 5 is a diagrammatic representation illustrating the step of twisting and compressing the honeycomb.

FIG. 6 illustrates the finished decorative object as produced by the method of the invention.

FIG. 7 is a plan view of a single layer of sheet material illustrating a preferred arrangement of the spaced parallel adherent portions.

In carrying out the method of the present invention, layers of sheet material such as colored paper are combined in a honeycomb structure. Such a structure is illustrated in FIGS. 1 through 4. Referring particularly to FIG. 4, the upper layer 10, the intermediate layers 12, and the bottom layer 14 are joined together at alternating parallel spaced adherent portions, as indicated for instance at 16, 18, 20, and 22. The parallel adherent portions may represent essentially narrow lines of adhesion which are provided by the application of adhesive just before each layer is joined to the layer beneath it. These lines of adherence may be referred to hereinafter as "adhesive lines" or "gum lines," even though it will be understood that the adhesive effect may be achieved without a separate adhesive material. FIG. 4 is a side view, and accordingly the adhesive lines 16, 18, 20, and 22 appear essentially as points because the viewer is looking in the direction in which the gum lines extend. However, the positions of the adhesive lines are indicated by dotted lines in FIGS. 1, 3, and 7.

Figure 1:
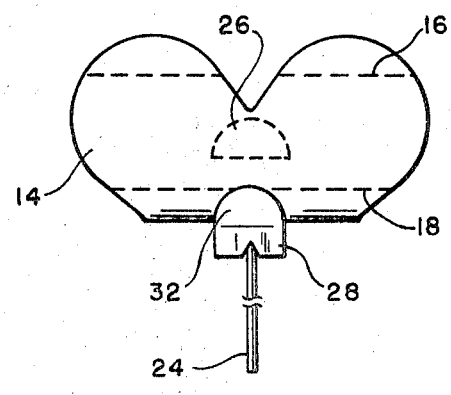
FIG. 1 illustrates an intermediate stage in the practice of the method of the invention in which the combined layers of sheet material may be in a folded condition capable of easy shipment.
Figure 3:
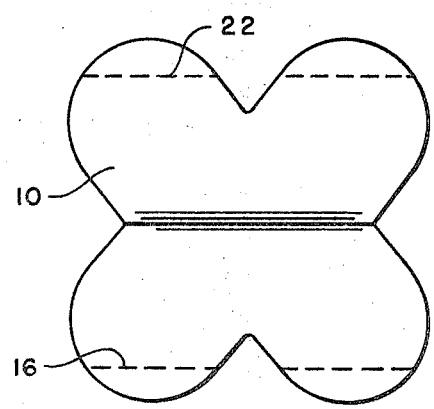
FIG. 3 is a top view of the combined layers of sheet material of FIG. 1 when unfolded.
Figure 4:
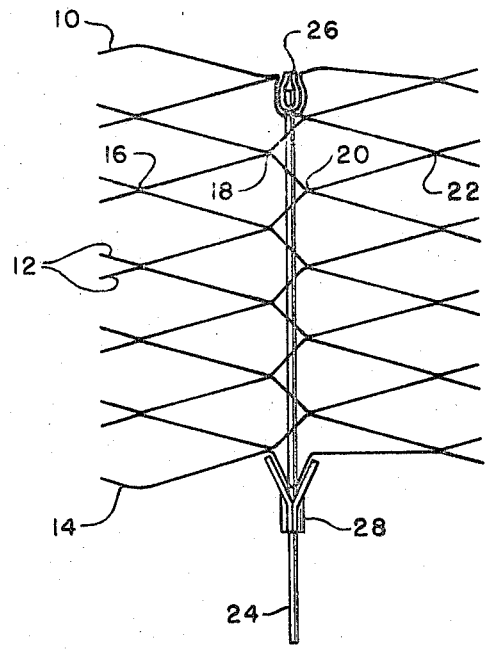
FIG. 4 is a side view of the honeycomb structure as it appears after the expanding step of the process.

After the honeycomb structure is formed by applying the adhesive and combining the layers, the edges of the combined layers are cut to a desired decorative outline such as generally illustrated by the top view of FIG. 3 and the plan view of a single layer shown in FIG. 7. This cutting of the peripheral edges can be accomplished by folding the combined layers at a centerfold which is parallel to the gum lines, as illustrated in FIG. 1. Both folded sides of all the layers are then cut in one operation. However, the cutting of the peripheral edges is preferably carried out while the layers are in the flat, unfolded, condition.

After the layers are combined, and the peripheral edges are cut to the desired outline, if required, the combined layers may be shipped in the folded condition illustrated in FIG. 1. In this condition, the layers are flat, closely spaced, and easily shipped, before the remainder of the method is carried out. In practicing the remainder of the method, the top and bottom layers 10 and 14 are firmly grasped, preferably near the central portions of each, and they are translationally moved apart to expand the honeycomb as illustrated in FIG. 4. Then, as schematically illustrated in FIG. 5, the bottom layer 14 is rotated and concurrently moved back towards the top layer 10 to accomplish a combined twisting and compressing action in which the compression is applied primarily at the central portions of the top and bottom layers 10 and 14. The number of turns in the twisting rotation may vary. However, in a preferred embodiment having a total of twenty layers of sheet material, approximately three turns of relative rotation of the bottom layer 14 with respect to the top layer 10 were found to provide very satisfactory results. In such a preferred configuration, the vertical height of the expanded structure, as illustrated in FIG. 4, is equal to approximately twice the maximum diagonal dimension of each layer configuration (as illustrated in FIG. 7). When all of the layers are tightly compressed at the central portion between the top and bottom layers 10 and 14, the decorative object is essentially complete, and resembles a flower blossom as generally illustrated in FIG. 6.

The top and bottom layers 10 and 12, and all of the intermediate layers, must be fixed together at the central portions thereof to prevent a decompression and resultant reopening of the honeycomb to the condition illustrated in FIG. 4. The preferred means for accomplishing this is to provide a stem member 24, as illustrated in each of the drawing FIGS. 1, 2, 4, 5 and 6, and to provide attachments of the top and bottom layers to the stem member, with the stem member extending through a central perforation which is cut in all of the layers.

In accordance with a preferred form of the invention, the attachments of the top and bottom layers 10 and 14 to the stem 24 are accomplished prior to the honeycomb expansion step illustrated in FIG. 4. These attachments may be carried out by means of attachment members which may be made of heavy paper or cardboard as indicated at 26 and 28 in FIGS. 1, 2, 4, and 5. The upper attachment member 26 may be permanently fixed at the upper end of the stem 24. The lower attachment member 28 is preferably arranged to be frictionally slidable upon the step, the friction being sufficient to hold the object in the twisted and compressed final position illustrated in FIG. 6. But the frictional resistance to sliding motion is limited enough to permit relative ease of movement into the expanded position illustrated in FIG. 4, and for the subsequent twisting and compression motion illustrated in FIGS. 5 and 6.

Figure 2:
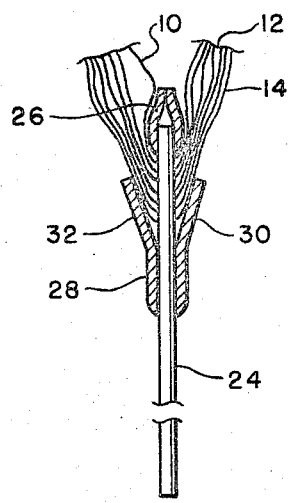
FIG. 2 is a partial sectional side view showing enlarged details of the arrangement of FIG. 1.

The structure employed in carrying out the invention is illustrated in its folded condition in FIG. 1. The stem attachment member 26 is shown in dotted outline in FIG. 1 because it is hidden beneath the folds of the sheet material. In order to relate the previous description of the gum lines to FIG. 1, the positions of the gum lines 16 and 18 are indicated in dotted form. It will be understood that the gum lines 22 and 20, separately shown in FIG. 7, are respectively located in alignment with the gum lines 16 and 18 in FIG. 1. In FIGS. 1, 2, and 6 the stem 24 is illustrated as "broken" indicating that it is intended to be much longer than illustrated. While the stem 24 may be of any desired length, it is preferably at least long enough to maintain full contact with the lower stem attachment member during full expansion of the honeycomb as illustrated in FIG. 4.

FIG. 2 is an enlarged detail side view, taken partially in section through the center line of the structure of FIG. 1 and illustrating the various layers of the sheet in profile. FIG. 2 particularly illustrates the mode of fastening of the attachment members 26 and 28 to the stem 24. The upper attachment member 26 is provided with a central perforation which is threaded over the tip of stem 24. It is folded double to embrace the stem 24 and fixed in place by an adhesive cement, or wire staple, or both. The upper layer 10 of sheet material may be folded around the attachment 26, and cemented to the outer surfaces thereof so that the upper holding member 26 is always hidden from view by the upper layer 10.

The lower holding member 28 is provided with two upper ear portions 30 and 32 having their inner surfaces cemented to the corresponding bottom central portions of the bottom layer 14. The lower body of the attachment 28 surrounds and embraces the stem 24 and the two sides of this attachment member may be fastened together with wire staples on each side of the stem, as the attachment 28 is viewed in FIG. 1. The two sides of this attachment member 28 are thereby spring biased in frictional engagement with the stem 24 to thereby resist longitudinal movement along that stem. The natural springiness of the material of member 28 in its bent condition around stem 24 accomplishes this. This frictional resistance to longitudinal movement accomplishes a number of purposes. For instance, it maintain the assembly in the collapsed and folded condition illustrated in FIGS. 1 and 2 during shipment and handling preliminary to opening the structure as illustrated in the subsequent figures. However, the most important purpose accomplished by this frictional resistance is to maintain this lower holding member in its uppermost position after the formation of the decorative object as illustrated in FIG. 6.

FIG. 3 is a top view of the structure showing the outline of the top layer 10 and the positions of the gum lines 16 and 22 as the structure is expanded to the condition illustrated in FIG. 4.

FIG. 4 illustrates the combined layers expanded to show the honeycomb arrangement. Because the upper layer 10 is cemented to the attachment member 26 at the central portion thereof, and because layer 10 has no layer above it to which it is attached, layer 10 is somewhat distorted in its configuration in relation to the "regular" layers 12 which are intermediate the top layer 10 and the bottom layer 14. Bottom layer 14 is similarly distorted because there is no layer beneath it, and because it is cemented to the attachment member 28.

The showing in FIG. 4 has been idealized, in that the individual sheet material layers are shown with the honeycomb completely open. For instance, the tips of the intermediate layers 12, outward from the outer gum lines 16 and 22, are shown as separated to illustrate the structure more clearly. When paper is employed for the layers, the material is fairly limp, and accordingly the tips of the layers outward from the gum lines 16 and 22 normally stay together, the upper layer resting on the tip of the lower layer. FIG. 4 illustrates only twelve layers of sheet material.

The number of layers employed in accordance with the present invention is not critical. If the flower blossom to be simulated by the decorative object need not be particularly full, then fewer layers are employed. If it is to be quite full, then more layers are employed. Furthermore, the structure of the present invention may be produced in many different sizes with excellent results. In one particular physical embodiment having a configuration similar to that illustrated in the drawings, twenty of the layers 10, 12, and 14 arranged in a honeycomb combination, similar to that illustrated in FIG. 4 were found to be very satisfactory.

FIG. 5 illustrates schematically the operation of twisting and compressing the honeycomb to form the finished decorative object as illustrated in FIG. 6. To accomplish this, the attachment member 28 is moved upwardly, and at the same time rotated, to accomplish a compression of the honeycomb in the twisted condition. The rotation can be carried out in either direction. The rotation is preferably accomplished by grasping the upper attachment member 26 with one hand while grasping the lower attachment member 28 with the other hand and thus pushing them together while at the same time twisting. The operation may be accomplished also by simply grasping the bottom of the stem 24 and pushing and twisting the attachment 28 upwardly upon the stem 24. It will be recognized that the twisting action is basically a relative movement. Thus, either the attachment member 28 may be rotated during the compression operation, or the attachment member 26 may be rotated, or both may be rotated in opposite directions to achieve the twist.

FIG. 6 is an attempt to illustrate the beautiful result achieved by the present invention. Since the resultant decorative object very closely simulates a natural flower blossom, it is difficult to illustrate in a drawing. The "petals" are arranged in a pleasing manner which is a sort of combination of random and regular arrangement. Because of the gum line honeycomb attachments of the "petals" to one another, and because of the twist accomplished in the final operation, the individual petal-like protrusions are provided with a certain amount of curling and twisting with relation to the axis defined by the stem 24. The combination of twisting and compression causes the petals to "bloom" in such a way that it is not at all apparent from the finished article that the structure has been twisted.

FIG. 7 is a plan view of a single layer 12 in a flat condition, indicating the preferred positions of the gum lines 16, 18, 20, and 22, and illustrating the central perforation 34 to accommodate the stem 24. While the gum lines 16–22 are all mutually parallel, they are not equally spaced. Thus, the two central gum lines 18 and 20 are quite closely spaced to the center of the layer, while the spacing from each central gum line 18 or 20 to its adjacent outer gum line 16 or 22 is quite wide.

The combination of four gum line positions such as illustrated at 16, 18, 20, and 22 is believed to provide the best result in accordance with the present invention and this is the preferred configuration of the structure of the invention. This limited number of gum lines provides a "honeycomb" which is quite open and loose, and thus easily twisted to provide the desired finished object.

The outer gum lines 16 and 22 are interrupted by the cutting of the notched portions 36 and 38 of the outline of each layer. Thus, each "petal" is separately attached to an adjacent "petal" of an adjacent layer. This is a preferred feature of the structure because it has been found to provide just the right amount of mutual support between petals, while permitting a twisting and curing of the petals which is pleasing, and which closely simulates natural flower petals.

In the configuration illustrated in these drawings, only four "petals" are provided in each layer. However, a different number of petals may be provided, and petals having pointed rather than rounded shapes may be provided if desired by simply modifying the outline of the peripheral edges of each layer. In all such configurations, however, it is preferred that each additional notch which is added to the peripheral outline (such as notches 36 and 38) to provide additional petals should interrupt one of the outer gum lines 16 and 22. Thus, each petal is attached to at least one of its neighbors on an adjacent layer at a point which is reasonably close to its outer tip.

While other varieties of flowers may be simulated by the present invention, the invention is particularly effective in simulating blossoms which have a full spherical shape in nature, such as roses, chrysanthemums, peonies, dahlias, begonias, marigolds, and the like.

The stem 24 is preferably formed of a rigid material such as a fiber reed or a wood rod. Another very suitable material is a wire coated with paint or covered with an extruded coating of green vinyl to simulate a natural green stem. However, it has been determined that nonrigid stem materials may also be employed, particularly where the decorative object is to be suspended in its display. For this purpose, a small diameter rope or cord may be used. The fact that such a limp stem member will not resist rotational movement is of no consequence in the present invention. This is due to the fact that when the final twisting and compressing operation is completed, the lower attachment member 28 maintains the compressed and twisted condition of the object only by resisting axial movement along the stem 24. Attachment member 28 need not resist rotation. This is because the collapsed layers themselves, if maintained in compression, do not provide any substantial resilient "untwisting" torque. They are interlocked sufficiently to resist untwisting.

If a "limp" stem such as a rope is employed, then the twisting and compression operation illustrated by FIGS. 5 and 6 must be accomplished by attaching the outer (bottom) end of the rope stem 24 to a fixed object. The stem may then be held in its extended position under tension by pulling outwardly upon the attachment member 26 while pushing and twisting the attachment member 28 towards the member 26 over the stem 24.

The layers 10, 12, 14 of sheet material are preferably composed of a thin colored paper. However, other materials may be employed for this purpose. For instance, vinyl sheets or thin metal foil sheets may be employed.

The peripheral outline of the combined layers is preferably cut while the layers are in the flat condition illustrated in FIG. 7. Special cutting dies may be used which punch out the center hole 34 as part of the same cutting operation.

While this invention has been shown and described in connection with particular examples, various alterations and modifications will occur to those skilled in the art. Accordingly, the following claims are intended to define the valid scope of this invention over the prior art, and to cover all changes and modifications falling within the true spirit and valid scope of this invention.

I claim:

1. A method for producing a decorative object comprising the steps of
   combining a plurality of layers of sheet material in a honeycomb structure by adhering the layers at alternating spaced parallel portions thereof,
   cutting the edges of said plurality of combined layers to a desired decorative outline.
   and wherein the improvement comprises the steps of
   expanding the resultant honeycomb by translationally moving the top and bottom layers apart with the expanded honeycomb extending therebetween,
   twisting and compressing the honeycomb by relative rotation of the upper and lower layers about an axis parallel to the direction of expansion while reducing the spacing between the central portions of the upper and lower layers,
   and fixing said plurality of layers together at the central portions thereof in the twisted and compressed condition.

2. A method as claimed in claim 1 wherein there is included the steps of
   cutting a central perforation in each of the layers,
   inserting a stem member through the perforations prior to expansion of the honeycomb,
   and the step of fixing the twisted and compressed layers being accomplished by attaching the top and bottom layers to the stem.

3. A method as claimed in claim 2 wherein the attaching of the top and bottom layers to the stem is accomplished prior to the expansion of the honeycomb, the resultant attachment to one of the top and bottom layers being frictionally movable upon the stem.

4. A method as claimed in claim 1 wherein the combined layers are folded double at a center line parallel to the alternating spaced parallel adhering portions prior to the step of cutting the peripheral edges to a desired decorative outline.

5. A method as claimed in claim 1 wherein
   the spaced alternating parallel adhering portions of said layers are formed by lines of adhesive limited to four in number including two spaced near the center line of each layer and two spaced substantially outward from the center line of each layer,
   the desired decorative outline of the combined layers is cut to provide notches separating individual flower-petal-like protrusions, and the notches separating the protrusions interrupt the associated outwardly spaced adhesive line so that each protrusion of each layer is attached individually to a corresponding protrusion of an adjacent layer.

6. A structure operable to form a decorative object comprising a plurality of layers of sheet material joined by transversely spaced parallel adherent portions, each layer being adhered to the adjacent layer on one side and then to the adjacent layer on the other side on an alternating basis at successive adherent portions to form a combination which resembles a honeycomb when it is expanded, wherein the improvement comprises the provision that each of said layers includes a central perforation therein, a central upper attachment member, a central lower attachment member, at least one of the uppermost layers of said sheet material being attached to said upper attachment member, at least one of the lowermost of said layers of sheet material being attached to said lower attachment member, a stem member fixed to said upper attachment member, said stem member extending through said central perforations, said lower attachment member having means for engagement with said stem member and being operable to resist longitudinal movement relative to said stem member.

7. A structure as claimed in claim 6 wherein said lower attachment member surrounds and resiliently embraces said stem member to provide said means for engagement therewith as a frictional means to resist longitudinal movement.

8. A structure as claimed in claim 6 wherein only two spaced parallel adherent portions are provided for each layer on each side of said central perforation, each adherent portion being narrow and essentially defining an adherent line, the spacing between adjacent adherent lines for each layer being uneven such that the spacing between the two most centrally located adherent lines is small in comparison to the spacing from each of said central adherent lines to the adjacent outer adherent line.

9. A structure as claimed in claim 8 wherein the individual layers are shaped so that each forms a plurality of petal-like protrusions each separated from its neighbor by a notch, said notches extending in beyond the associated outer adherent line to interrupt the outer adherent line at each petal-like protrusion, at least the outer portion of each petal-like protrusion being thereby attached at said outer adherent line to at least one adjacent petal-like protrusion of an adjacent layer.

10. The structure as claimed in claim 6 wherein said stem member is a non-rigid cord.

11. A structure as claimed in claim 6 wherein said stem member is a substantially rigid member.

12. A structure as claimed in claim 11 wherein said stem member comprises a metal wire.

13. A structure as claimed in claim 11 wherein said stem member comprises a wooden rod.

14. A structure as claimed in claim 6 wherein said sheet material is comprised of paper.

References Cited

UNITED STATES PATENTS

| | | | |
|---|---|---|---|
| 3,174,894 | 3/1965 | Paige | 161—68X |
| 2,692,449 | 10/1954 | Jones | 161—28 |
| 2,282,657 | 5/1942 | Kirchen | 161—30 |

PHILIP DIER, Primary Examiner

U.S. Cl. X.R.

161—30, 31, 68, 112; 156—250, 291